United States Patent [19]

Mosher

[11] Patent Number: 4,753,306

[45] Date of Patent: Jun. 28, 1988

[54] COMBINATION WEIGHING METHOD AND APPARATUS USING MULTI-BIN SCALES

[75] Inventor: Oren A. Mosher, Hayward, Calif.

[73] Assignee: Package Machinery Company, East Longmeadow, Mass.

[21] Appl. No.: 899,660

[22] Filed: Aug. 25, 1986

[51] Int. Cl.⁴ .................... G01G 13/00; G01G 13/22
[52] U.S. Cl. ........................................ 177/25; 177/91
[58] Field of Search .................... 177/25.18, 90–92, 177/1

[56] References Cited

U.S. PATENT DOCUMENTS

| | | | |
|---|---|---|---|
| 3,966,000 | 6/1976 | Allen | 177/91 X |
| 4,418,771 | 12/1983 | Henry et al. | 177/25.18 X |
| 4,437,527 | 3/1984 | Omae et al. | 177/25.18 |
| 4,534,430 | 8/1985 | Steel | 177/25.18 |
| 4,538,693 | 9/1985 | Klopfenstein et al. | 177/25.18 |
| 4,616,722 | 10/1986 | Moran | 177/25.18 X |

Primary Examiner—George H. Miller, Jr.
Attorney, Agent, or Firm—McCormick, Paulding & Huber

[57] ABSTRACT

A combination weighing machine produces a weight of product closely approximating a target weight by selecting a combination of lesser weights from a plurality of weigh scales and discharging the selected combination into a container or packaging machine. Each weigh scale has multiple bins for weighing and discharging multiple quantities of product respectively, and a single weight sensor. The weight of product in each bin is determined separately by delivering product to one bin at a time and measuring the change in the aggregate weight of product on the scale after each delivery. The weights determined for each bin are stored and are used in searching for and selecting an acceptable combination for discharge.

15 Claims, 5 Drawing Sheets

COMBINATION WEIGHING METHOD AND APPARATUS USING MULTI-BIN SCALES

BACKGROUND OF THE INVENTION

The present invention resides in a combination weighing machine and is concerned more particularly with a combination weighing machine having multiple bins on each scale.

In an effort to improve the accuracy and speed of combination weighing machines, the number of scales employed in a combination weighing machine is normally increased. To avoid the expense involved with the addition of more scales to a machine, memory buckets have been added to store a product previously measured by a scale, and an acceptable combination is obtained by searching combinations of the measured weights in the memory buckets. For example, U.S. Pat. Nos. 4,418,771 and 4,437,527 disclose combination weighing machines in which the product is first weighed in a scale and then discharged into memory buckets for selection of an acceptable combination. When that combination is found, the associated memory buckets are dumped into a common discharge path leading to a packaging or other machine.

Alternatively, the combination search can be performed among the weights of products in both the memory buckets and the weigh scales, as indicated in U.S. Pat. No. 4,454,924.

One disadvantage of the prior art machines which employ memory buckets is that they add another tier of buckets below the weigh scales and increase the overall height of the machine. Furthermore, the memory buckets introduce an additional step in dropping product through the machine from a bulk distributor above to the discharge path below. The additional height plus the additional handling increase the likelihood of damage to the product. The memory buckets in a combination weighing machine cannot be checked or tared like scales for product and weight buildup, and therefore the overall accuracy of the discharged weights suffers. The cost of the combination weighing machine is also increased through the additional height of the machine required by the memory buckets and the cost of the memory buckets including the dumping doors as well as the dumping controls for both the scales and the memory buckets.

It is accordingly a general object of the present invention to provide a combination weighing machine having the speed and accuracy of a combination weighing machine with a high number of scales or scales and memory buckets without the disadvantages discussed above.

SUMMARY OF THE PRESENT INVENTION

The present invention resides in a combination weighing apparatus and its method of operation for producing a weight of product closely approximating a target weight.

The combination weighing apparatus includes a plurality of weigh scales, each scale having multiple bins for receiving and discharging multiple quantities of product. A single sensor is provided in each scale for detecting the aggregate weight of product in the bins at any given time and generates a corresponding weight signal. Feeder means deliver quantities of product to each pin of the scale at different points in time to enable the weight of product in each bin to be determined from the increase in the aggregate weight of the scale after each delivery.

Reading and storing maens are connected with the plurality of scales and respond to the generated weight signals to determine and store the weight of product in each bin. Combination searching means reads the stored weights in a searching routine to select an acceptable combination of bins that yields a total weight of product closely approximating the target weight. Control means connected with the multiple bins of the scales then discharges the total weight of product from the acceptable combination of bins.

The multi-bin combination weighing apparatus avoids the additional height requirement of prior art machines utilizing memory buckets and allows the scales which hold the quantities of product to be tared. No additional handling of the product nor drop height is added to the machine; thus, product damage is no greater than that of a conventional combination weighing machine without the memory buckets. The extra expense of the memory buckets and the height added to the machine is avoided in favor of the slight cost of adding extra bins to the conventional weigh scale. The multi-bin scales offer accuracy and speeds of operation matching combination weighing machines having far greater numbers of scales but without significantly greater costs.

DESCRIPTION OF THE PREFERRED EMBODIMENTS

Figure 1:
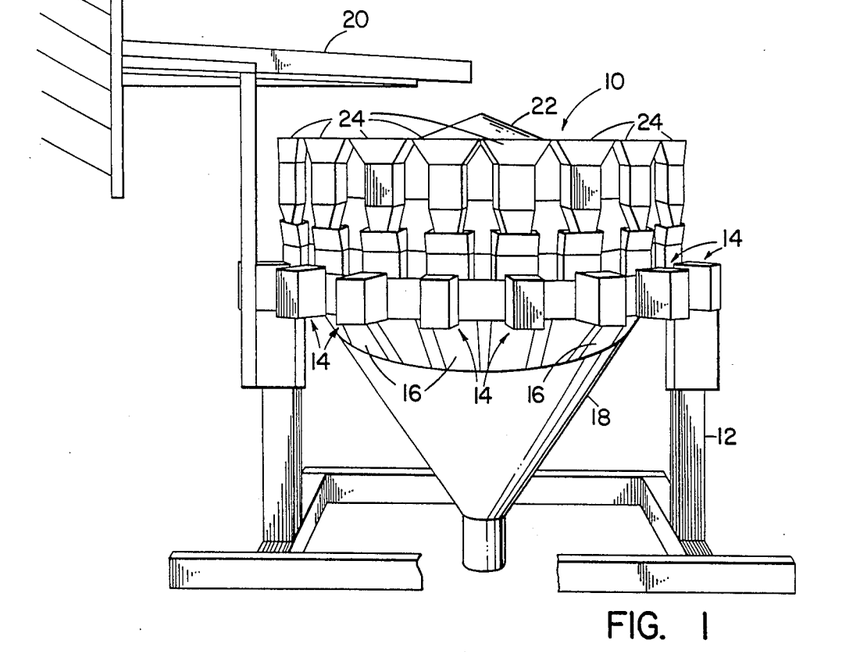
FIG. 1 illustrates a combination weighing machine having scales with multiple bins according to the present invention.

FIG. 1 illustrates a combination weighing machine, generally designated 10, which employs the present invention to produce a weight of product closely approximately a target weight. The products handled by the machine vary widely from finely divided foods, such as candies or nuts to fruits, frozen chicken parts, and non-food products, all of which must be generally flowable to pass through feeders and a discharge chute and which have uniform or variable weights per piece. In accordance with conventional combination weighing machines, the machine 10 determines the weights of multiple quantities of the product and then selects a combination of the quantities having a total weight most closely approximating the target weight, and generally not less than the target weight, for discharge into a container or a packaging machine.

The combination weighing machine 10 is supported on a frame 12 and has a plurality of weigh scales 14 distributed in a circular array about a central, vertical axis of the machine. Each of the scales has an associated dump chute 16 which guides product dumped from the scales into a collector or discharge chute 18 for discharge into an associated packaging machine not shown.

Figure 2:
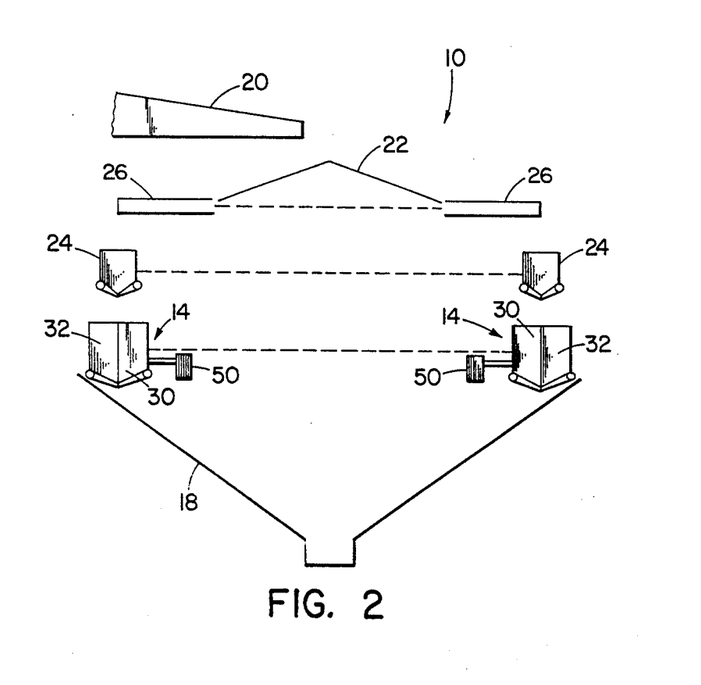
FIG. 2 is a schematic diagram of the combination weighing machine in FIG. 1.

A bulk feed conveyor 20 at the top of the machine 10 delivers product from a storage bin (not shown) and keeps a relatively steady supply of product in a conical distribution tray 22 centrally above the circular array of weigh scales 14. Both the conveyor 20 and the tray 22 can be provided with controlled vibrators to ensure movement of the flowable product as needed into the machine. A plurality of time-filled accumulator buckets 24 are distributed in a circular array about the distribution tray 22, and each bucket 24 receives product from the distribution tray 22 through an intermediate vibratory feeder 26 (FIG. 2). The accumulator buckets are fed with a quantity of product which is coarsely equivalent to a fraction of the target weight. For example, the vibratory feeders may be selected to operate for a fixed period of time that is considered adequate to deliver onethird or one-fourth of the product expected to be discharged from the combination weighing machine at the target weight. Since the precise target weight is achieved through the combination search and selection process, it is not necessary that the weight of product in the accumulator buckets 24 be precisely metered, and in fact, random variations are desired for selection of acceptable combinations.

Figure 7:
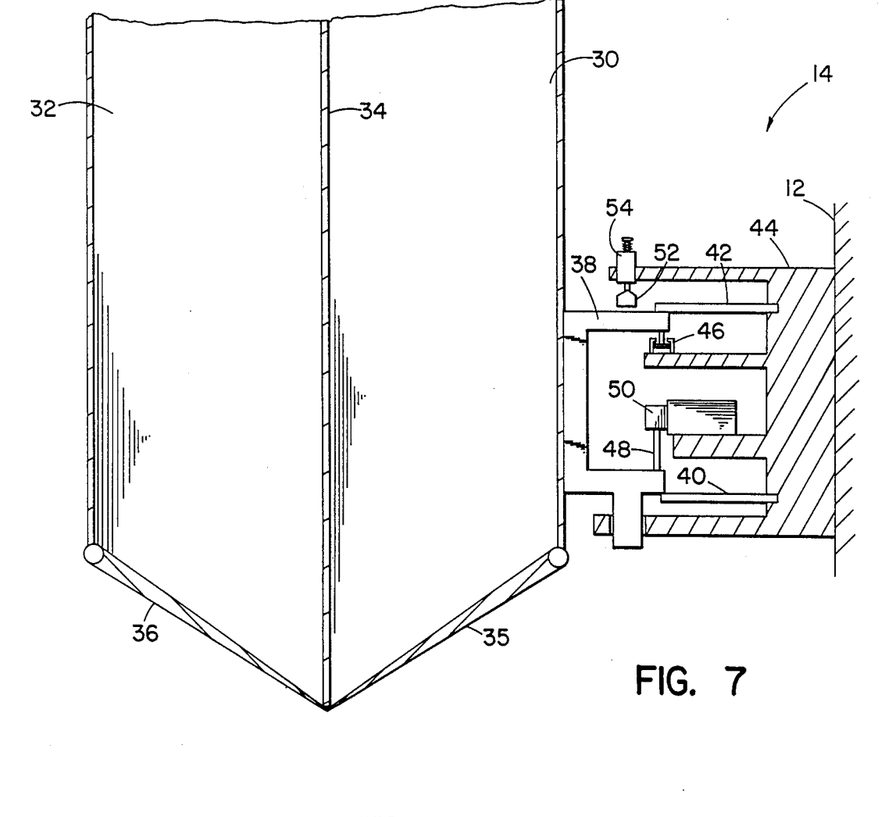
FIG. 7 is a schematic illustration of a multi-bin weigh scale of the present invention.

FIG. 7 illustrates in schematic form one embodiment of a weigh scale 14 which is constructed in accordance with the present invention. The scale includes a hopper which is divided into two bins 30,32 by means of a central partition 34. The bin 30 has a movable door 34 controlled by a pneumatic actuator (not shown) for dumping product out through the bottom of the bin on command, and the bin 32 has a similar movable door 36. The bins 30,32 are supported from the machine frame 12 by means of the sensing portion of the scale 14 which includes the balance beam 38, the flex hinges 40 and 42 and the scale housing 44. The flex hinges resiliently support the weight of product in the bins 30,32 relative to the housing 44, and a dashpot 46 is provided to damp undesired vibrations.

A weight sensor 50 in the form of a strain gauge is coupled to the balance beam 38 by means of a rigid wire 48 and produces a weight signal that is proportional to the aggregate weight of product in both bins 30 and 32. To calibrate the signal, a known calibration weight 52 and associated actuator 54 are connected above the balance beam at the upper side of the housing 44. Normally, the calibration weight is lifted out of contact with the balance beam, as illustrated.

A weigh scale having a sensing portion, such as illustrated in FIG. 7, is described in further detail together with the calibration and processing of the weight signal in U.S. Pat. No. 4,550,792.

In the schematic illustration of the combination weighing machine 10 of FIG. 2, the accumulator buckets 24 are disposed immediately above the respective scales 14, and each bucket is provided with two discharge doors which enable product within the bucket to be fed exclusively to the bin 30 or 32 of the associated weigh scale. Thus, it is possible to discharge product from one bit of the scale into the collector chute 18 and refill that bin without disturbing the weight of product in the other bin.

Figure 3:
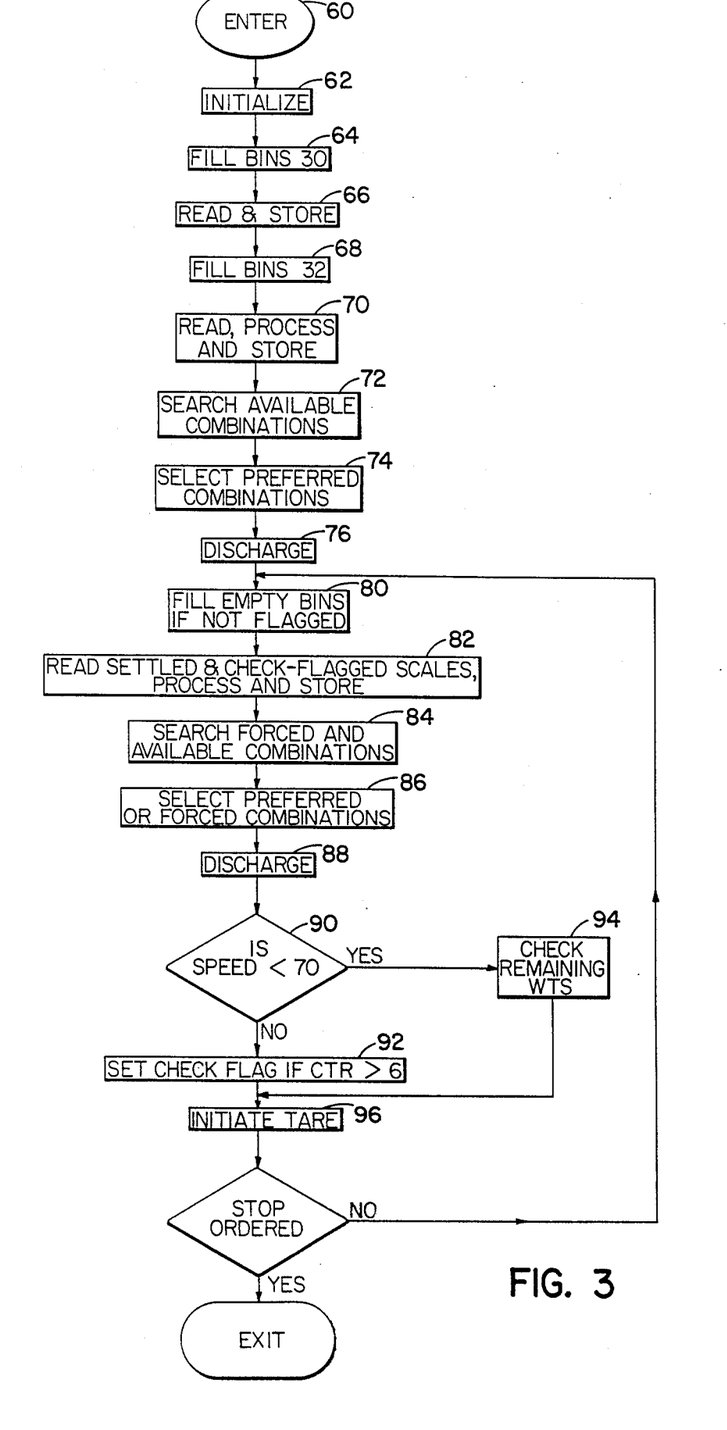
FIG. 3 is a flow chart illustrating the sequence of instructions followed by the control computer which operates the combination weighing machine of FIGS. 1 and 2.

FIG. 3 is a flow chart which illustrates the basic program followed by a microprocessor within the combination weighing machine 10 for controlling the sequence of operations which produce predetermined weights of product closely approximating a target weight in a cyclic operation. The program also includes scale servicing subroutines which, for example, periodically tare the scales and check the weights of products in individual bins to eliminate cumulative error.

When weighing operations are begun, the program represented by the flow chart of FIG. 3 is entered at 60. All parameters are initialized at instruction 62, and the initialization step includes the taring of all scales after a suitable warm-up period. Assuming that the bins of all scales are initially empty, the bins 30 are filled first according to the instruction 64. With the bins 32 on all scales 14 still empty and the bins 30 settled, readings from the weight sensors 50 are taken at instruction 66, and the read weights are stored by scale in a memory of the microprocessor as the weights of product in the respective bins 30.

During the settling period after filling the bins 30, the accumulator buckets 24 are again loaded with a charge of product so that the bins 32 of all scales can be filled in accordance with instruction 68. After a suitable settling time, the weight sensors 50 are read again. The weight signal taken at this point from each scale represents the aggregate weight of product in both bins. However, the increase in the weight signal between instructions 66 and 70 represents the weight of product added to bin 32 at step 68. By arithmetically subtracting from the aggregate weight the weight of product in the bin 30, which is stored in memory, the actual weight of product in bin 32 is determined and then stored in memory.

When the program has completed instruction 70, all bins of all scales have been filled with fresh product, and the weight of product in each bin is known and stored in memory.

The program then advances to instruction 72 where a search for an acceptable combination of bins is performed to produce the weight of product closely approximating the target weight. During the searching process, the weights in each bin stored in memory are added together in various combinations. Combinations which produce a weight of product generally above the target weight but within a predetermined tolerance, are stored temporarily in memory, and are periodically replaced as combinations of bins more closely approximating the target weight are found. The combination search can be performed in accordance with the method described in U.S. Pat. No. 4,466,500, and the best combination of the searches can be selected as indicated at step 74 in accordance with the method described in U.S. Pat. No. 4,535,856, both patents having the same assignee as the present invention. As a result of the selection at step 74, an acceptable combination of bins is established, and the product from that combination of bins is dumped into the discharge chute 18 for packaging in accordance with instruction 76. The weight data for the dumped bins is erased from memory at the same time, since the selected bins are now empty.

The criteria for selecting an acceptable combination as described in the referenced U.S. Pat. No. 4,535,856 give preference to combinations which do not comprise recently filled bins, to combinations which consist of fewer bins, in addition to combinations which meet the target weight and tolerance criteria. In the present invention, an additional criterion for selecting combinations includes a preference for combinations which do not comprise two or more bins on the same scale. This preference is set forth among the selection criteria to maximize the number of available combinations in the next search. As indicated by steps 64–70 above, it is essential that bins on a given scale be filled and allowed to settle at different times in order to read and store accurate weight data for each bin on the scale. If both bins of the scale are dumped as part of the acceptable combination, at least two fill cycles are required before the scale can again contribute two weights to the group of weights that are searched for an acceptable combination. Therefore, the preference for combinations which do not comprise bins from the same scale provides the largest possible complement of bins and choice of available combinations. Of course, if the combination including two bins from the same scale is the only acceptable combination, then that combination is selected. The practice of excluding bins on the scale can be made mandatory with combination weighing machines having a number of scales that is great enough to tolerate the more limited selection of combinations without loss of the ability to closely approximate the target weight.

In this respect, another advantage of the combination weighing machine with multiple bin scales is the more efficient utilization of the vibratory feeders 26 and accumulator buckets 24. Generally, the feeders and the buckets can load a charge of product into a weigh scale at a much higher rate than the combination weighing machine can process the weight data and dump the selected combination. With multiple bins on each scale, the vibratory feeder and accumulator bucket can be filling one empty bin of a scale while the combination weighing machine is performing a search operation and dumping product from the other bin of the scale. After settling of the one bin, the feeders are ready to fill the other.

After the first dumping operation at instruction 76, the emptied bins are filled in accordance with instruction 80 in FIG. 3, provided that a flag has not been set to inhibit refill of a bin. With a multi-bin scale combination weighing machine, there are several occasions when it is not desirable to refill a scale.

For example, in order to tare a scale for the zero point value off the weight signal, all bins of a scale must be emptied, which generally requires at least two dump cycles to rid the scale of product. After the first bin is dumped, the refill that normally takes place at step 80 must be inhibited while the second bin is emptied and taring takes place. Another reason for inhibiting refill is to eliminate cumulative error in the stored weight data for a scale. Errors inherent in the reading of the weight signal and in the signal itself accumulate in the stored weight data with each refill. It is therefore desirable to periodically inhibit refill of one bin of the scale in order to obtain by direct measurement an accurate reading of the weight of product in the other bin of the same scale. In each case, refill is inhibited by a flag as discussed further below.

The scales, which are refilled at instruction 80, are read at instruction 82 and the weight signals are processed to determine the weights of product in the newly refilled bins. Each new refill weight is determined by subtracting the stored weight of product in the other bin from the aggregate weight measured by the scale sensor 50. At the same time, the scales which were not refilled because they have been flagged for checking are read in order to determine accurately the weight of product in one filled bin. The read weight of the filled bin is then substituted in the microprocessor memory for the previously stored weight that was calculated from a series of aggregate weight readings, and the flag is reset.

When all of the scale readings have been taken and stored, the stored readings are searched for acceptable combinations, and a preferred combination is selected in a manner similar to that performed at instructions 72 and 74. The combination search at 84 and selection at 86, however, is modified in some cases by forcing certain scales to be part of the selected combination.

For example, scales which require taring must first be empty as indicated above, and those scales are flagged to inhibit refill of one bin at instruction 80. The remaining bin is emptied by forcing the bin to be part of the selected combination at instructions 84 and 86. Otherwise, several dump cycles may pass before the bin is selected naturally to be part of the dumped combination. If the machine waited for the natural selection process to occur, accuracy would be compromised because of the reduction in the number of potential combinations resulting from the empty bin of the taring scale.

In a forced combination search operation, the stored weight of product in the taring scale is subtracted from the predetermined target weight and the search thereafter is limited to the remaining scales and the reduced target weight.

After the preferred or forced combinations have been selected at instruction 86, the selected combination of bins is dumped in accordance with instruction 88, the program advances to branch 90 where the preset speed of the combination weighing machine is interrogated. If the predetermined speed of the combination weighing machine is set to be 70 dumps per minute or more, the program advances to instruction 92 which examines bin alternation counters for each of the dumped scales 14. The counters record the number of times that dumping or refill alternates between the two bins. Error in the calculated refill weights increases with each such alternation and must be periodically eliminated to maintain accuracy. Hence, if the alternation count is greater than a predetermined count, for example 6, a check flag is set for the particular scale so that the filling of the scale during the next cycle of operation is inhibited at instruction 80, and the direct reading of the weight in the remaining bin can be taken at instruction 82 to eliminate accumulated error. When the check flag is set, the counter is also reset to zero so that the check reading will be taken from the scale periodically depending upon the frequency with which the dumped bins of a scale alternate.

If the machine speed is set at less than 70 dumps per minute, the program advances from branch 90 to instruction 94 and the weight signals are checked on those scales which discharged product from one of the bins and retained product in the other bin. The weight-checking step at this stage of a fill and dump cycle is possible due to the slower speed of operation and the short period of time in which door-closing vibrations of a scale dissipate.

After provisions for checking scale weights have been attended to at instructions 90, 92, and 94, taring operations are carried out at subroutine 96 to check the zero point value of the weight signal from a scale. These instructions consist of setting a scale flag to inhibit refill of the emptied bin of a recently dumped scale at instruction 80, and actually taring a scale that is now totally empty due to the forced selection of the scale at instructions 84 and 86. After subroutine 96 has initiated the taring operations, the program advances to branch 100. If a stop command has been ordered to stop the weighing operations of the machine, the subroutine is exited at 102. If the operation has not been ordered to stop, then the program returns to instruction 80, and the filling, weighing, and dumping cycle is repeated. The taring operation in the meantime is carried out on a scale, and when that operation is complete, the scale flag is reset to allow the scale to participate in subsequent machine cycles.

In one embodiment of the invention, the taring operation is performed at times intervals, and the scale selected for taring is preferably one of the dumped scales which has operated continuously for the longest period of time without a taring operation.

Another option for selecting scales to be tared is to simply select the scale which has operated the longest without taring and force both bins of that scale into the selected combination. In this case, accuracy of the dumped weight of product may suffer because of the reduced probability of matching the two selected bins with one or two other bins to achieve the target weight.

Figure 4:
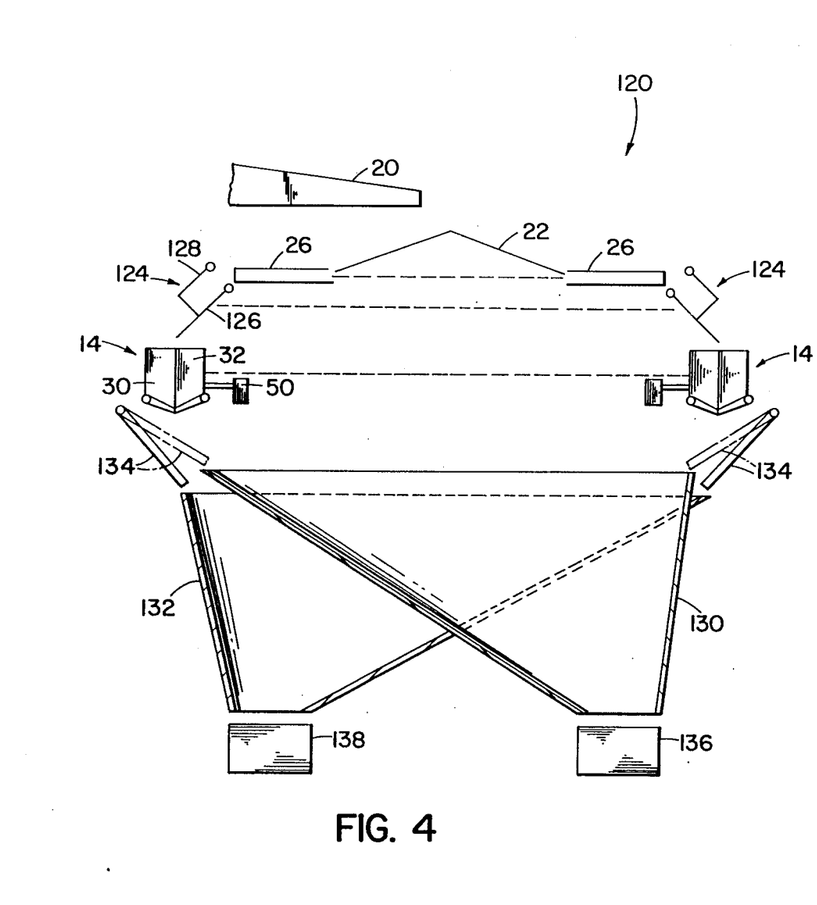
FIG. 4 is a schematic diagram illustrating another embodiment of the combination weighing machine having multiple bin weigh scales and multiple discharge paths.

Another embodiment of the invention is illustrated in the combination weighing machine of FIG. 4 where previously described components bear the same reference numerals.

The feeding mechanism for delivering product to the weigh scales 14 utilizes the conical distribution tray 22 and vibratory feeders 26 as described above. The holding buckets 124, however, include a movable discharge slide 126 and a cutoff paddle or gate 128. Product falls into a bucket 124 at the end of the vibratory feeder 26. The slide 126 which is pivotally mounted at its upper end to the frame is movable to drop product into either the bin 30 or the bin 32 of the corresponding scale. The cutoff gate 128 is also pivotally mounted at its upper end to the frame for movement with the slide but is actuated to open and close the slide to pass or interrupt the flow of product into the selected bin. The operation of the gate 128 is time controlled to coarsely meter the quantity of product dumped into the bin. The principal advantage of the holding bucket 124 is that the product is handled more gently as it slides into a bin, in comparison to conventional accumulating buckets such as shown in FIG. 2 where product drops first into the bucket.

More importantly, the embodiment of the combination weighing machine 120 is provided with two separate discharge chutes 130 and 132 and variably positioned diverters 134 under the scales which direct product from the respective scales into one or the other of the discharge chutes. The discharge chutes have a generally assymetric, conical configuration, and the chute 130 extends into and through the chute 132 so that the mouth of either chute can be reached by product discharged from the bins of the selected scales by way of the diverters 134. The chute 130 drops the product into a packaging machine 136, and the chute 132 drops the product into a packaging machine 138. However, a temporary storage device associated with one of the chutes might be used so that both chutes could feed product to a single, high-speed packaging machine.

In operation, the combination weighing machine 120 is similar to the machine 10 of FIG. 2. However, unless separate diverters are provided for each bin or the bins of each combination are discharged at different times, the scales which have bins selected for discharge into one of the chutes as the preferred combination cannot be included in the preferred combination discharged into the other of the chutes. This mutual exclusivity of the preferred combinations necessitates a slightly higher number of scales to maintain acceptable accuracy, but due to the twin discharge system provided by the diverters 134 and the discharge chutes 130 and 132, higher packaging rates are obtained since twice the number of packages are discharged per cycle.

The combination weighing machine 120 can be operated in both an in-phase mode wherein the product is discharged down both of the chutes 130 and 132 simultaneously, or an alternate phase node in which product is discharged first down one of the discharge chutes and then down the other. In a case of alternate phasing of the discharges, the prohibition against dumping bins on the same scale can be removed since the diverters 134 can change position between dumps and the vibratory feeders have generally a much shorter duty cycle than the scales themselves so that reloading of both bins on a single scale can be accomplished in short periods of time.

For example, a first combination search is perfomed on all bins and a preferred combination excluding bins from the same scale is dumped into one of the discharge chutes. The diverters 134 are then readjusted while a second search is performed on the remaining bins and a second quantity of product is dumped down the other of the discharge chutes. The dumping down alternate chutes can continue at a high production speed provided that the number of scales remaining in a steady state operation offers a selection of combinations that provide the required accuracy.

Figure 5:
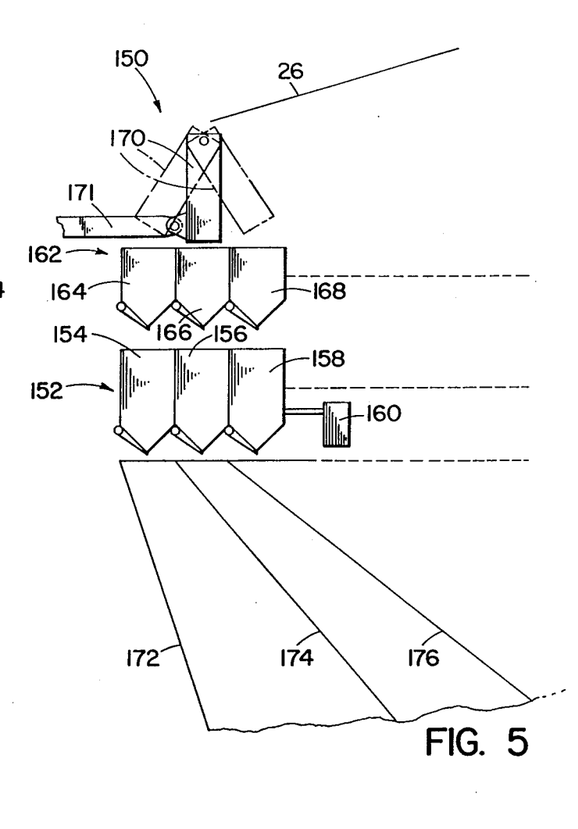
FIG. 5 is a schematic diagram illustrating a further embodiment of a combination weighing machine having multiple weigh scales.

A further embodiment of the combination weighing machine generally designated 150 is illustrated in FIG. 5. In this embodiment, each weigh scale 152 includes three bins, 154, 156, and 158, and a single sensor 160 for detecting the aggregate weight in all bins. In this embodiment, the weight of product in each bin must again be determined by delivering the product to the bins at different times and by subtracting the stored weights of each loaded bin from the aggregate weight measured after each delivery.

The product is delivered to the three bins by a multi-bin accumulating bucket 162 with bins 164, 166, and 168 feeding the scale bins 154, 156, and 158 respectively. In order to load the accumulating bins, a movable diverting tube 170 is provided at the discharge end of the vibratory feeder 26. The diverting tube is pivoted at its upper end adjacent the feeder and is moved at the bottom end by operating rod 171 in accordance with the accumulating bin that requires the product.

Three discharge chutes 172, 174, and 176 are arranged concentrically below the circular array of weigh scales 152. In contrast to the embodiment of the combination weighing machine 120 shown in FIG. 4, each bin of the weigh scales cannot discharge product into each of the discharge chutes, but instead must discharge product into the one of the discharge chutes having its mouth disposed directly below the bin. Correspondingly, each combination search must be limited to the bins 154, the bins 156, or the bins 158, and the selected combinations can be discharged through the chutes either simultaneously or in phased relationship.

Figure 6:
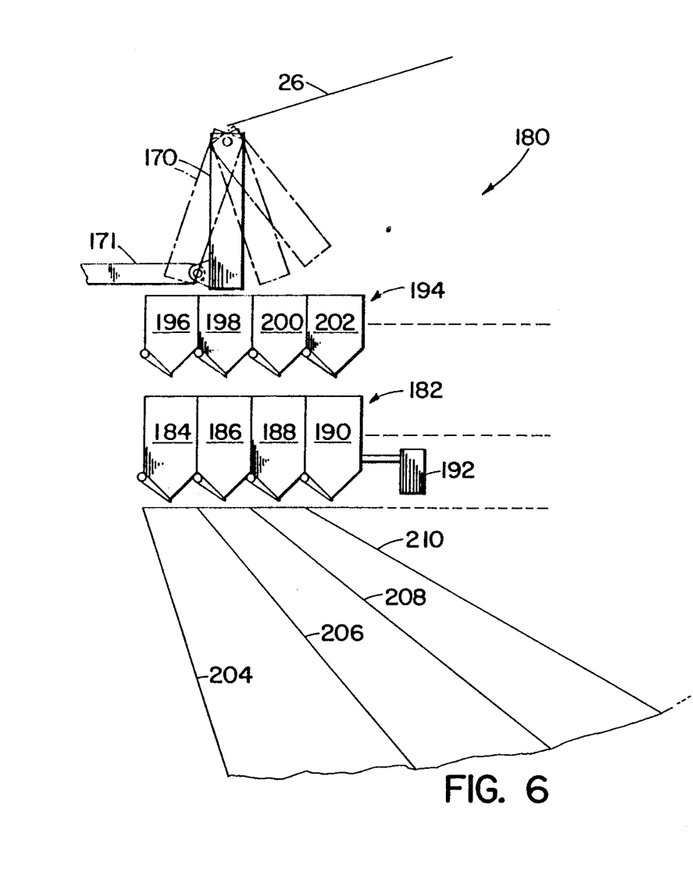
FIG. 6 is a schematic diagram illustrating still another embodiment of a combination weighing machine having multiple bin weigh scales.

FIG. 6 illustrates still a further embodiment of the combination weighing machine generally designated 180. This embodiment is similar to the embodiment of FIG. 5 except that the weigh scales 182 include four bins 184, 186, 188, 190 and a single sensor 192. The bins of a scale are supplied by an accumulator bucket 194 which has four bins 195, 198, 200, 202 and feed product into the respective, underlying bins of the weigh scale 182. The distribution tube 170 at the discharge end of the vibratory feeder 26 distributes product to each of the accumulator bins, and generally due to the low duty cycle of the feeder, four bins would not exceed its feed rate capacity.

Each scale bin 184, 186, 188, 190 discharges product into a corresponding discharge chute 204, 206, 208, or 210. The larger number of bins and discharge chutes enables higher packaging rates to be achieved.

Figure 8:
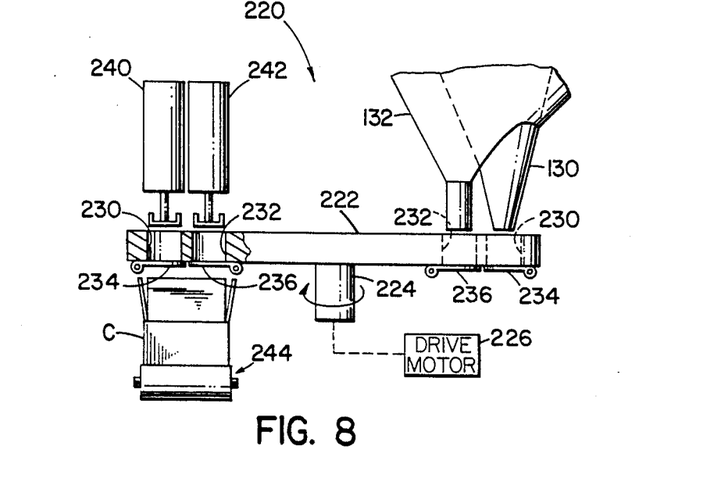
FIG. 8 is a schematic illustration of a high-speed package loading table below the discharge chutes of a multi-bin scale combination weighing machine.
Figure 9:
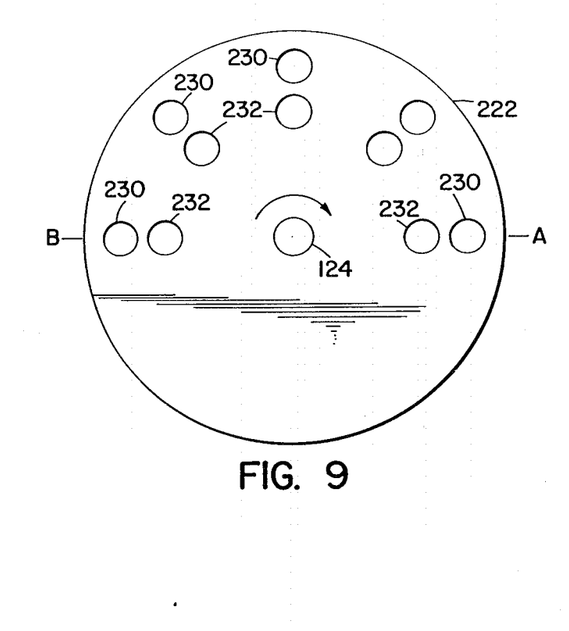
FIG. 9 is a plan view of the table shown in FIG. 8.

The high packaging rate which the disclosed combination weighing machines achieve cannot always be handled by the packaging machines themselves, because the product does not move fast enough under the effects of gravity. To overcome the product movement problem, a high-speed loader, generally designated 220 in FIGS. 8 and 9, is interposed between the discharge chutes of the combination weighing machine and packages or the packaging machine being loaded. The loader is comprised of a loading table 222 which is rotatably indexed on an axle 224 by means of a drive motor 226. The table, as seen most clearly in FIG. 9, has storage receptacles or pockets 230,232 distributed in sets at equally spaced locations about the periphery of the table. Drive motor 226 rotatably indexes the table 222 to bring each set of pockets sequentially and periodically into each of the diametrically opposite positions designated A and B in FIG. 9. The discharge chutes 130 and 132, for exmaple, of the combination weighing machine 120 in FIG. 4 are located over the loading table 222 at the position A and register with the respective pockets 230,232 in that index position. The pockets 230,232 are closed at their bottom ends by means of spring-biased doors 234,236 so that product discharged from the chutes 130,132 is retained in the pockets and can be carried from position A to the position B in a series of indexing motions of the table.

A set of pneumatically actuated plungers 240,242 are mounted above the loading table 222 at the position B to force product deposited in the pockets 230 and 232 respectively out through the bottoms of the pockets into a waiting carton C. The carton is positioned under the pockets by means of a conveyor 244 of a packaging machine.

In operation, a group of pockets 230,232 is moved into position A to receive weighed quantities of product from the discharge chutes 130,132. By means of a sequence of indexing motions of the table, the product in the pockets is moved under the plungers 240,242 at position B. The plungers 240,242 are actuated momentarily to force the product through the doors 234,236 and into the waiting carton C. The plungers are then retracted, the table is indexed, and another weighed quantity of product is brought into position B for loading into the same or another carton that is moved into position by the conveyor 244.

The forced expulsion of the product into the carton C by the plungers 240,242 eliminates the speed limitations imposed on product dropping into containers such as the cartons C under the influence of gravity. Obviously, the conveyor 244 could also be replaced by the forming tube of vertical form, fill and seal packaging machine, and the acceleration imparted to the product would carry the product into the forming tube and allow higher packaging rates to be achieved. While the limitations on product drop time have not been addressed in this manner in the past, the speed rates that can be reached with multi-bin combination weighing machines suggest that this problem now be addressed.

While the present invention has been described in several preferred embodiments, it should be understood that numerous modifications and substitutions can be had without departing from the spirit of the invention. In this regard, it should be kept in mind that the illustrations in FIGS. 2 and 4–9 are schematic in order to illustrate the principles involved. The number of bins associated with each scale and the number of scales installed in each machine affect the ultimate speed of the machine with larger numbers of scales generally permitting higher speed. Accordingly, the present invention has been described in several embodiments by way of illustration rather than limitation.

I claim:

1. A combination weighing apparatus for producing a weight of product closely approximating a target weight comprising:

a plurality of weigh scales, each scale having multiple bins for receiving and discharging multiple quantities of product respectively and a sensor detecting the aggregate weight of product in the bins of the scale at any give time and generating a corresponding weight signal;

feeder means for delivering a quantity of product to each bin of the scales, the delivery of a quantity of product to one bin of a scale being made at a time different from the delivery of a quantity of product to another bin of the same scale;

reading and storing means connected with the plurality of scales and responsive to the generated weight signals for determining the weight of product in each bin from the weight signals detected after each delivery and storing the arithmetically determined weight;

combination searching means connected with the reading and storing means for selecting from the stored weights an acceptable combination of bins that yields a total weight of product closely approximating a target weight;

control means for dumping the total weight of product from the acceptable combination of bins; and weight checking means for taking a new weight reading from a scale after one bin of the scale is dumped and before refilling by the feeder means and having means for correcting the stored, arithmetically determined weight of a remaining bin of the scale on the basis of the new weight reading.

2. A combination weighing apparatus as defined in claim 1 wherein the weight checking means includes a counter for each scale; and the weight checking means is reponsive to the counter and takes a new weight reading only when the count of for a scale has reached a predetermined count.

3. A combination weighing apparatus as defined in claim 1 wherein:

the weight checking means includes refill inhibiting means for preventing the refilling of a dumped bin of a scale until a new weight reading is taken.

4. A combination weighing apparatus for producing a weight of product closely approximating a target weight comprising:

a plurality of weigh scales, each scale having multiple bins for receiving and discharging multiple quantities of product respectively and a sensor detecting the aggregate weight of product in the bins of the scale at any given time and generating a corresponding weight signal;

feeder means for delivering a quantity of product to each bin of the scales;

reading and storing means connected with the plurality of scales and responsive to the generated weight signals for determining and storing separately the weight of product in each bins of the scales;

combination searching means connected with the reading and storing means for selecting from the stored weights an acceptable combination of bins that yields a total weight of product closely approximating a target weight;

control means for discharging the total weight of product from the acceptable combination of bins; and taring means for measuring the zero point value of the weight signal for each multiple bin scale, including selecting means for identifying scales to be tared and refill inhibiting means for preventing the bins of the identified scales from being refilled until all bins are emptied and the zero point value of the weight signal is measured.

5. A combination weighing apparatus as defined in claim 4 wherein:

the taring means further includes combination forcing means for including the bins of the scales identified by the tare selecting means in the acceptable combination of bins selected by the combination searching means.

6. A combination weighing apparatus for producing a weight of product closely approximating a target weight comprising:

a plurality of weigh scales, each scale having multiple bins for receiving and discharging multiple quantities of product respectively and a sensor detecting the aggregate weight of product in the bins of the scale at any given time and generating a corresponding weight signal;

feeder means for delivering a quantity of product to each bins of the scales;

reading and storing means connected with the plurality of scales and responsive to the generated weight signals for determining and storing separately the weight of product in each bin of the scales;

combination searching means connected with the reading and storing means for identifying from the stored weights a plurality of acceptable combinations of bins, each acceptable combination yielding a total weight of product closely approximating a target weight, and inluding means for selecting from among the acceptable combinations a preferred combination for discharge; and control means for discharging the total weight of product from the preferred combination of bins.

7. A combination weighing apparatus as in claim 6 wherein the means for selecting in the combination searching means establishes a priority of the combinations acceptable for selection, which priority gives preference to combinations in which all bins are on different scales.

8. A combination weighing apparatus for producing a weight of product closely approximating a target weight comprising:

a plurality of weigh scales, each scale having multiple, associated bins for receiving and discharging multiple quantities of product respectively and a sensor detecting the aggregate weight of product in the bins of the scale at any given time and generating a corresponding weight signal;

feeder means for delivering a quantity of product to each bin of the scales;

reading and storing means connected with the plurality of scales and responsive to the generated weight signals for determining and storing separately the weight of product in each bin of the scales;

combination searching means connected with the reading and storing means for selecting from the stored weights acceptable combinations of bins that yield weights of product closely approximating a target weight, the searching means including means for excluding from the acceptable combinations, combinations composed of more than one bin from the same scale; and control means for discharging the total weight of product from the acceptable combination of bins.

9. A combination weighing apparatus for producing a weight of product closely approximating a target weight comprising:

a plurality of weigh scales, each scale having multiple bins for receiving and discharging multiple quantities of product respectively and a sensor detecting the aggregate weight of product in the bins of the scale and generating a corresponding weight signal;

feeder means for delivering a quantity of product to each bin of the scales;

reading and storing means connected with the plurality of scales and responsive to the generated weight signals for determining and storing separately the weight of product in each bin of the scales;

combination searching means connected with the reading and storing means for selecting from the stored weights acceptable combinations of bins that yield a total weights of product closely approximating a target weight;

at least two discharge chutes provided for receiving product from the plurality of weigh scales;

control means responsive to the searching means for discharging product in the bins associated with one acceptable combination into one of the discharge chutes and another acceptable combination into another of the discharge chutes;

temporary product storage means positioned at the outlets of the discharge chutes and having a movable table containing multiple sets of storage receptacles, each set having one receptacle for each discharge chute, the table being movable to index one set of storage receptacles at a time under the outlets of the discharge chutes to receive discharged product from the scales; and powered means associated with the temporary product storage means for forcing stored product from the receptacles into the packaging machine.

10. A combination weighing apparatus for producing a weight of product closely approximating a target weight comprising:
- a plurality of weigh scales, each scale having multiple bins for receiving and discharging multiple quantities of product respectively and a sensor detecting the aggregate weight of product in the bins of the scale at any given time and generating a corresponding weight signal;
- feeder means for delivering a quantity of product to each bin of the scales, and including a plurality of holding buckets, each bucket having multiple bins receiving product for delivery to the bins of the scales and a diverter directing product from a bulk supply into the individual holding bins;
- reading and storing means connected with the plurality of scales and responsive to the generated weight signals for determining and storing separately the weight of product in each bin of the scales;
- combination searching means connected with the reading and storing means for selecting from the stored weights an acceptable combination of bins that yields a total weight of product closely approximating a target weight; and
- control means for discharging the total weight of product from the acceptable combination of bins.

11. A combination weighing apparatus for producing a weight of product closely approximating a target weight comprising:
- a plurality of weigh scales, each scale having multiple bins for receiving and discharging multiple quantities of product respectively and a sensor detecting the aggregate weight of product in the bins of the scale at any given time and generating a corresponding weight signal;
- feeder means for delivering a quantity of product to each bin of the scales, and including a plurality of adjustable holding buckets, each bucket having a discharge slide and a cutoff gate movable above the multiple bins of a given scale to drop product selectively into the individual bins;
- reading and storing means connected with the plurality of scales and responsive to the generated weight signals for determining and storing separately the weight of product in each bin of the scales.
- combination searching means connected with the reading and storing means for selecting from the stored weights an acceptable combination of bins that yields a total weight of product closely approximating a target weight; and
- control means for discharging the total weight of product from the acceptable combination of bins.

12. A method of obtaining a weight of product closely approximating a target weight by combining selected weights of product from a plurality of weigh scales, comprising the steps of:
- providing on each weight scale of the plurality multiple bins for receiving and discharging weights of product, each weigh scale generating a weight signal representative of the aggregate weight of product in all of the bins of the scale at any given time;
- delivering a quantity of product of each bin of the scales in the plurality, each bin receiving the delivered product at a time different from the other bins of the same scale;
- reading the weight signals from the scales after each delivery, and determining the weight of product in each bin from the read weight signals;
- searching the determined weights of product in the bins for selection of an acceptable combination of bins that yields a combined weight of product closely approximating a target weight;
- discharging the combined weight of product into a receiver from the acceptable combination of bins; and
- checking the determined weights of product in a selected scale by reading the weight signal from the scale immediately after product in one of the bins of the scale is discharged and before the discharged bin is refilled by delivering of another quantity of product.

13. A method of obtaining a weight of product closely approximating a target weight by combining selected weights of product from a plurality of weigh scales, comprising the steps of:
- providing on each weigh scale of the plurality multiple bins for receiving and discharging weights of product, each weigh scale generating a weight signal representative of the aggregate weight of product in all of the bins of the scale at any given time;
- delivering a quantity of product to each bin of the scales in the plurality, each bin receiving the delivered product at a time different from the other bins of the same scale;
- reading the weight signals from the scales after each delivery, and determining the weight of product in each bin from the read weight signals;
- searching the determined weights of product in the bins for selection of a combination of bins that yields a combined weight of product closely approximating a target weight and that includes no more than one bin from any scale; and
- discharging the combined weight of product into a receiver from the selected combination of bins.

14. A method of obtaining a weight of product closely approximating a target weight by combining selected weights of product from a plurality of weigh scales, comprising the steps of:
- providing on each weigh scale of the plurality of multiple bins for receiving and discharging weights of product, each weigh scale generating a weight signal representative of the aggregate weight of product in all of the bins of the scale at any given time;
- delivering a quantity of product to each bin of the scales in the plurality, each bin receiving the delivered product at a time different from the other bins of the same scale;
- reading the weight signals from the scales after each delivery, and determining the weight of product in each bin from the read weight signals;
- searching the determined weights of product in the bins for selection of a combination of bins that yields a combined weight of product closely approximating a target weight, including the step of giving preference in selecting to combinations which do not have bins on the same scale; and
- discharging the combined weight of product into a receiver from the selected combination of bins.

15. In a method of obtaining a weight of product closely approximating a target weight by combining selected weights of product from a plurality of weigh scales, including the steps of providing on each weigh scale of the plurality multiple bins for receiving and discharging weights of product, each weigh scale generating a weight signal repesentative of the aggregate weight of product in all of the bins of the scale at any given time; delivering a quantity of product to each bin of the scales in the plurality, each bin receiving the delivered product at a time different from the other bins of the same scale; reading the weight signals from the scales after each delivery, and determining the weight of product in each bin from the read weight signals; searching the determined weights of product in the bins for selection of a combination of bins that yields a combined weight of product closely approximating a target weight; and then discharging the combined weight of product into a receiver from the selected combination of bins, the improvement comprising:

identifying a scale to be tared;

forcing the loaded bins of the identified scale into the acceptable combinations of weights in order to discharge the loaded bins;

preventing product from being delivered to the discharged bins of the identified scale to be tared until all bins of the scale are discharged and then taring the identified scale before product is delivered to the bins of the scale.

* * * * *